(12) United States Patent
Carstens

(10) Patent No.: US 8,015,093 B2
(45) Date of Patent: Sep. 6, 2011

(54) RANDOMIZED TRADING APPARATUS AND METHOD

(76) Inventor: Matthew D. Carstens, Grand Rapids, MI (US)

( * ) Notice: Subject to any disclaimer, the term of this patent is extended or adjusted under 35 U.S.C. 154(b) by 547 days.

(21) Appl. No.: 12/176,584

(22) Filed: Jul. 21, 2008

(65) Prior Publication Data

US 2009/0037319 A1 Feb. 5, 2009

Related U.S. Application Data

(60) Provisional application No. 60/953,561, filed on Aug. 2, 2007.

(51) Int. Cl.
*G06Q 40/00* (2006.01)

(52) U.S. Cl. ...................................... 705/36 R; 705/37
(58) Field of Classification Search .......... 705/35–36 R; 706/36 R–37
See application file for complete search history.

(56) References Cited

U.S. PATENT DOCUMENTS

| 6,018,722 | A | 1/2000 | Ray et al. |
| 6,317,728 | B1 | 11/2001 | Kane |
| 7,149,714 | B1 * | 12/2006 | Halpern ...................... 705/36 R |
| 7,720,784 | B1 * | 5/2010 | Froloff ........................... 706/47 |
| 2002/0069152 | A1 | 6/2002 | Silva et al. |
| 2007/0255965 | A1 * | 11/2007 | McGucken ................... 713/193 |

* cited by examiner

*Primary Examiner* — Thu Thao Havan
(74) *Attorney, Agent, or Firm* — Price Heneveld LLP

(57) ABSTRACT

An apparatus and method of training helps separate emotions from decisions. A user account with single masked login allows selective access to a live account with actual funds and a demo account with false funds. A program randomly causes trading in the live and/or demo accounts according to a predetermined percentage, allowing the user to place trades/bets but without letting the user know which account is active. The present method further determines if trades/bets on the live and demo accounts are not offset/flat, and potentially forces the user to continue trading on the same accessed account. When the user logs out, the present method syncs the demo account to the live account, generates data concerning differences between live and demo accounts, and gives feedback to at least one of the user and a system controller.

17 Claims, 3 Drawing Sheets

(Method) (Circumstance where trade/bet is offset/flat at logout)*

(Method) (Circumstance where trade/bet is NOT offset/flat at logout)*

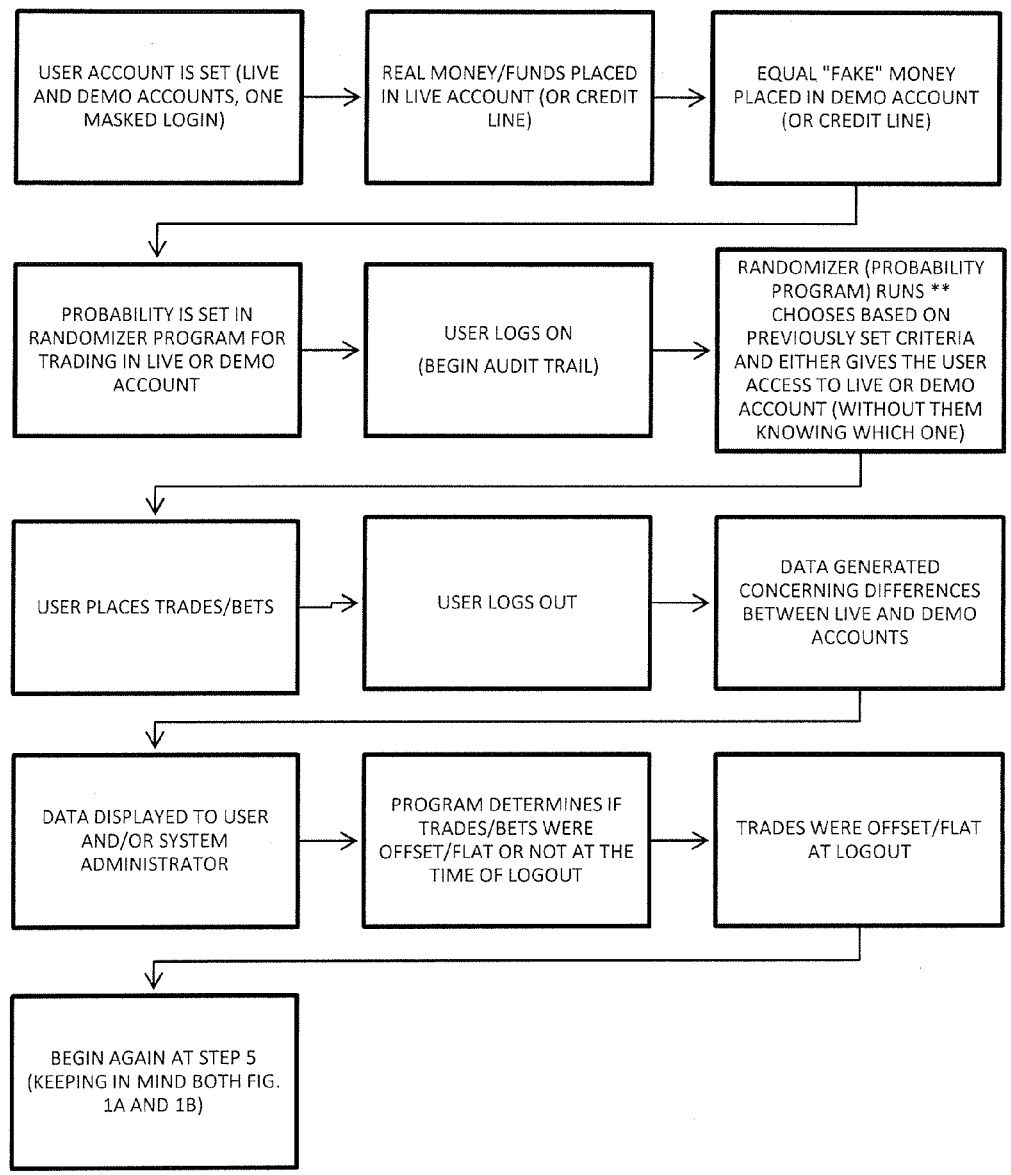
Fig. 1a (Method) (Circumstance where trade/bet is offset/flat at logout)*

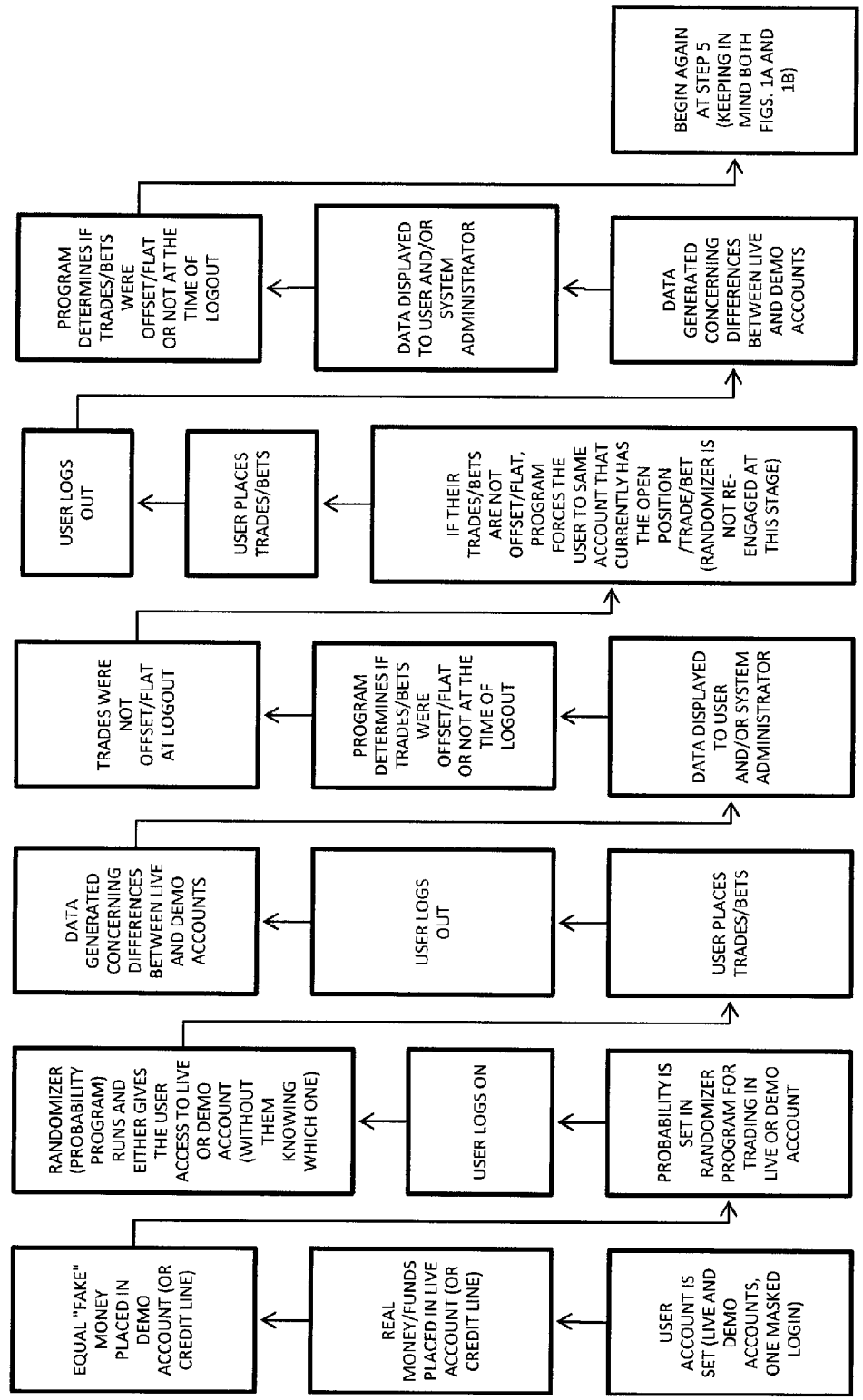
Fig. 1b (Method) (Circumstance where trade/bet is NOT offset/flat at logout)*

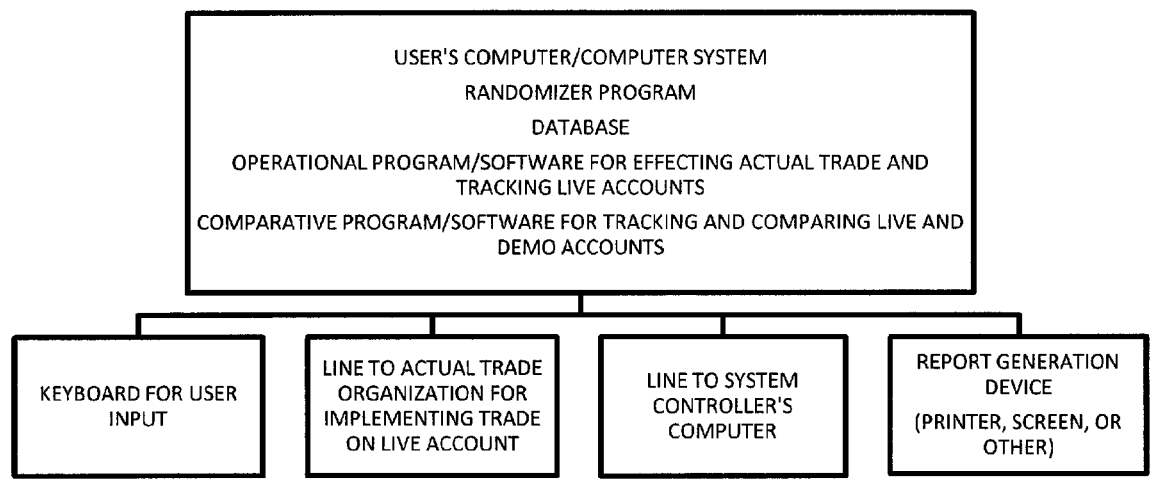
Fig. 2 (Apparatus)

RANDOMIZED TRADING APPARATUS AND METHOD

This application claims benefit under 35 U.S.C. §119(e) of provisional application Ser. No. 60/953,561, filed Aug. 2, 2007, entitled RANDOMIZED TRADING ACCOUNT.

BACKGROUND

The present invention relates a trading apparatus and method where a trader (or other user such as a student or trainee or speculator/gamer) makes decisions without knowing whether actual and/or phantom accounts are being traded, thus creating a learning/training situation and/or a measurable/assessment situation. However, a scope of the present invention is not believed to be limited to only financial trading industries.

Human emotions affect trading decisions. Most experts agree that this is not a good thing. However, I do not know of existing tools that are truly effective in training traders (nor to give feedback to traders or to employers) of the effect and extent that emotions affect (or have affected) decisions. In particular, trading decisions often change or are biased based on the amount of money involved (i.e., money at risk) in the decision. I have not found any existing tools that use a masked combination of real funds and fake funds to train traders, nor that provide data for analyzing the same and for giving feedback to the trader and/or to employer companies.

SUMMARY OF THE PRESENT INVENTION

In one aspect of the present invention, a method to help control emotions from decisions, comprises steps of setting up a user account including a live account and a demo account, and including a single masked login. Real funds are deposited in the live account and "fake" money is shown in the demo account that is equal to the real funds. The method further includes providing a randomizer program for randomly causing trading in the live and/or demo accounts according to a predetermined percentage, allowing a user to log in, running the randomizer program to give the user access to one of the live or demo accounts, and allowing the user to place trades/bets without letting the user know if they are trading in the live or demo account. The present method further includes determining if trades/bets on the live and demo accounts are "flat" (also called "offset") (i.e., if they have no market risk meaning no outstanding market positions). If the trade/bets are not flat, the user is forced to continue trading on the accessed account (i.e., account that currently has market risk (or a position)) without the randomizer being re-engaged and without allowing the user to know which is the accessed account. Still further, upon the user logging out, the present method includes a step of causing the live and demo accounts to sync again to the live account, generating data concerning differences between live and demo accounts, and displaying data to at least one of the user and a system controller.

In another aspect of the present invention, a method of training to help a user separate emotions from decisions, comprises steps of setting up a live account and a demo account, depositing real funds in the live account, showing an amount of "false" money in the demo account (which may include a credit line) that is equal to the real funds, randomly causing trading in one or both of the live and demo accounts according to a predetermined percentage, giving the user access to one of the live or demo accounts without showing the user which one account is active, allowing the user to place trades/bets without letting the user know if they are trading in the live or demo account, and comparing final data from the live and demo accounts for evaluative purposes.

In another aspect of the present invention, an apparatus includes a computer system with at least one computer, a user input, a data base, and at least one display. The computer is programmed with a randomizer program, an operational program for effecting trades in the live and demo accounts based on predetermined percentages but randomized access, and a comparator program adapted to compare information related to account activity and favorable/unfavorable results in the live and demo accounts and for generating a report displaying the activity and results. A line connecting the computer system to a second system for implementing trades on the live account.

In still another aspect of the present invention, an apparatus for controlled decision-making includes a computer system having at least one computer, a user input, a data base, and at least one display. The computer is programmed with a randomizer program for providing randomized access incorporating predetermined access percentages, an operational program for effecting trades in the live and demo accounts based on the predetermined access percentages of the randomized access, and a comparator program adapted to compare information related to account activity in the live and demo accounts.

An object of the present invention is to allow a trader to use one login to a financial trading on-line account while hiding multiple trading accounts with their own user specific credentials behind the initial logged in account. The hidden multiple trading accounts comprise one live account with actual funds deposited with the clearing firm, and one demo account with play/fake funds deposited. The multiple trading accounts accept (i.e., the software puts into effect) trading decisions, with only a predetermined number of random transactions actually acting on the live account, and with a remainder acting "artificially" on the demo account. The percentage of funds traded in the actual and demo trading accounts can be varied over time, based on various criteria of success, experience, and/or favorable results. However, results are only shared with the user after logoff. Alternatively, they can be managed in a back office function for detailed report/statement analysis at any time.

An object of the present invention is to help traders (and students) learn to control and gauge their emotions and its effect on decision making. The present system and methods help traders understand and fine-tune their personal investment systems and decision-making strategies, while identifying emotional variables and contributions so that they can keep the emotional variables under control. Specifically, an object of the present system and methods is to help users learn why they make money on "demo accounts" but not on "live accounts" (i.e., how they can overcome the emotional affect when trading live money). The present system and methods specifically help traders understand the difference between emotions, decision-making, and one's overall focus between trading live and demo accounts. The employer also gains information of the trader's abilities to control the effect of emotions on trading decisions.

An object of the present invention is to help traders break through conventional "demo trading" and to provide reality-based learning of how to control their emotions, including learning how to master themselves and to "separate" their emotions from decisions.

An object of the present invention is to provide companies with a tool to educate and measure the ability of traders. In particular, the present apparatus and methods are a tool geared toward helping a trader with their hardest problem . . . controlling themselves.

An object of the present invention is to help firms attract customers to fund their own account as they initially start trading. Traders need to have some funds on deposit and opened to really start to practice with this method. The present invention gives the appearance of reality to the trader (and can be used to give educational feedback to the customer), even if the trader (or customer) knows that some of the funds are phantom and not real.

An object of the present apparatus and methods is to help traders learn on a reality-based system to control and gauge their emotions and its effect on decision-making, and also to allow their employers to also gauge and measure the same. The present apparatus and methods help traders understand and fine-tune their personal investment systems and decision-making strategies, while identifying emotional variables so that they can keep the emotional variables under control. Specifically, users of this apparatus and methods can learn why they make money on "demo accounts" but not on "live accounts." The present apparatus and methods specifically help traders understand the difference between emotions, decision-making, and one's overall focus between trading live and demo accounts.

An object of the present apparatus and methods is to provide data that can be analyzed regarding: a trader's skill/ability in keeping emotions out of live trading, and/or a trader's tendency to become emotional in different markets such as bear or bull markets, and/or a trader's tendency to become emotional in particular industries and/or if they believe the live funds they have at risk are small enough to not cause concern/added stress and the effects when the amount of live funds at risk is increased.

These and other aspects, objects, and features of the present invention will be understood and appreciated by those skilled in the art upon studying the following specification, claims, and appended drawings.

BRIEF DESCRIPTION OF DRAWINGS

FIGS. 1a and 1b are flow charts showing a method of using the present apparatus for randomized trading.

FIG. 2 is a schematic showing the present apparatus of FIGS. 1a and 1b.

DETAILED DESCRIPTION OF PREFERRED EMBODIMENTS

The present randomized trading system, apparatus, and methods allow a trader to use one login to a financial trading on-line account while hiding multiple trading accounts with their own user specific credentials behind the initial logged in account. The hidden multiple trading accounts comprise one live account with actual funds deposited with the clearing firm, and one demo account with play/fake funds deposited. The multiple trading accounts accept (i.e., the software puts into effect) trading decisions. It is contemplated that the percentage of times that the funds are traded in the actual and demo trading accounts can be varied randomly at the time of each login, or can be varied (manually) over time based on various criteria of success and/or (favorable) results. For example, as a trader achieves "successful unemotional trading" and proves that his investment decisions are not adversely affected by emotions or by the amount of funds being invested, the percentage applied to the actual live account could be increased while the demo account of "false" money is decreased.

It is contemplated that historical data can be analyzed to determine the effect of emotions on the trader's decision making. For the first time, "black and white" documented information will be available (using the present system) based on the trader's abilities and tendencies, which can be provided to the trader personally, or to users, or to the investment firms, or to the clearing firms, and or to other interested third parties. Specifically, the data will show the ability of the trader to handle large funds prior to them actually managing any large funds. No longer will users have to rely solely on the trader's assurances that he can trade large or small amounts without any statistically significant difference in rate of return or performance.

In the present system, once the trader (or student) logs in using their single "master" login, the live and demo accounts are randomized (based on specific probabilities which are in the details below) to not show the trader if they are in fact trading on their live account (i.e., real money) or demo account (i.e., "fake money"). Initially, a trader would have all the live and demo accounts with the same amount of funds in each so they cannot determine the difference between the live and demo accounts from the onset. This again will enable one single login for access to multiple accounts consisting of at least one live and one demo account. However, the trader is purposefully unaware if they are actually logging into an account funded with actual funds or fake funds or if they believe that the live funds they have at risk is small enough to not cause concern/added stress.

Ensuring the trader cannot tell the difference between real money and fake money is paramount in ensuring they trade seriously at all times, and not only when real money is on the line. Furthermore, it trains traders to focus and control their emotions. This is an extremely important skill for traders, because most traders act differently when they know if they are trading with real or fake funds.

To ensure credibility of execution with the clearing firm and trader and for full disclosure with both the trader and clearing firm, the trader would have the ability to pull logs on their computer as needed that matches all trades, IP addresses, server information, or any other relevant tracking information, executions, and times with the clearing firm for both the live and demo accounts under the single login.

The present apparatus and methods are extremely useful since, based on my research, many traders and persons in this industry believe that this new "crossover" system will help them learn to control and gauge their emotions and its effect on decision making. The present apparatus and methods help traders understand and fine-tune their personal investment systems and decision making strategies, while identifying emotional variables so that they can keep the emotional variables under control. Specifically, users of this apparatus and methods learn why they make money on "demo accounts" but not on "live accounts." The present apparatus and methods specifically help traders understand the difference between emotions, decision-making, and ones overall focus between trading live and demo accounts.

In this method and apparatus, a trader (or company or system controller/operator) can select what probability they want to use in the randomized trading account program. For example, an initial setting could be 70% probability of initial logins to be with a demo account and the other 30% probability of initial logins to be with a live account. It is contemplated that the probability can be set at any selected ratio, such as 80/20, 40/60, or 10/90, etc. It is contemplated that the probability will initially be set to cause a majority of the "trading" to occur in the demo account, so that the user can practice on "fake" funds more often than not, yet still have enough perceived risk from the fact they may actually be trading on the actual account with live/real money.

It is contemplated that a trader (or company or system controller/operator) can potentially have a different value unit (i.e., dollars, shares, contracts, lots, and/or other measurable equivalent value units) in the live and demo accounts. Also, the trader could choose not to have (or not be given) an account with the same amount in their demo and live accounts. In this circumstance, the initial account to be logged into would be preset (by the trader or company) to allow each unit (i.e., share, contract, lot, etc.) to have a preset amount/value for either their live or demo account. Example: One (1) share traded in the initial logged in account would actually be trading five (5) shares (or some percentage of total monies in a master fund or credit line) in the live account (if selected by the randomizer) and would be "trading" two (2) shares in the demo account (if selected by the randomizer). However, the trader would only recognize one (1) share being traded and would again not able to determine if it is on live or demo funds . . . until logoff.

It is contemplated that the present system, apparatus, and methods can also be used in other areas beyond just financial investing and trading. For example, it is contemplated that a scope of the present system includes other money-related areas such as gaming/gambling, as well as non-financial situations such as decisions related to physical sports (such as a decision to "go for it" on fourth down in a football game).

Example

Initially, an account is set up on a computer system or web application, programmed and connected as necessary for implementation as described below. (See FIGS. 1a, 1b, and 2.) First, a live account is set up and (real money) funds are deposited therein. Also, a demo account is set up with fake/phantom money. Both the live account and demo account have equal funding, thus assuring that the user cannot "figure out" which fund is the live fund. A "masked" login is made that is used for both the live and demo accounts. The live and demo accounts are split in the back-end of the program for tracking purposes, however the user must not see this on the front-end (at login). Probability is set up in the masked account so when the user logs into their masked account, a randomizer program will run under the set-up conditions. The randomizer program will run based on what percentages are set up for the user to be logged into—either in their live or demo account. (e.g., 5% live and 95% demo, or 20% live and 80% demo, or 50% live and 50% demo, or even 0% live and 100% demo, etc.) Again, the user does not know when they login if they are actually logged into the live or demo account. Notably, the percentage can be manually adjusted as the trader proves success.

After account set-up, the user logs into their account by using the "masked" user name and password. The randomizer (probability program) runs and either gives the user access to their live or to their demo account. In a first circumstance (see FIG. 1a), the user is logged into their demo account and places trades/bets (not knowing if they are trading in their live or demo account). However, the randomizer or operating program causes the trades/bets to go to (operate on) the live account. If the trades/bets are not flat by the time they logout, then each subsequent login will force them to this account and the randomizer is not re-engaged. (The term "flat" (also referred to as "offset" herein) means that the account accessed has no market risk . . . i.e., no outstanding market positions, which is an important factor in assessing the value in an account after trading.) Once the trades/bets are offset and the user logs out, the randomizer and operator program will engage at re-login and the balances of both the live and demo accounts will sync again to the live account. At this time the user will "know" if they traded on the live or demo account using simple deduction by looking at their account balance. However, this is after the wager has been completed and thus cannot be changed.

In a second circumstance (see FIG. 1b), the user is logged into their demo account and the user places trades/bets (not knowing if they are trading in their live or demo account). However, the randomizer or operating program causes the trades/bets to go to (operate on) the demo account. If the trades/bets are not flat by the time they logout, then each subsequent login will force them to this account and the randomizer is not re-engaged. Once the trades/bets are flat and the user logs out, the randomizer will engage at re-login and the balances of both the live and demo accounts will sync again to the live account. At this time the user will "know" if they traded on the live or demo account using simple deduction by looking at their account balance. However, it is after the wager has been completed and thus cannot be changed.

The process/method is repeated every time the user logs into their account using the "masked" user name and password.

The present apparatus (FIG. 2) includes a keyboard or other input device for user input, a computer system including or connected to the user's computer. The computer system includes a randomizer program for generating randomized access control to the live and demo accounts. The computer system includes (or provides access to) a database of the accounts and other operating systems, processes, and requirements. The computer system includes an operational program/software for effecting actual trade and tracking live accounts in the database. A line connects the computer system to an actual trade organization, gaming or betting environment for implementing the trades/bets on live or demo accounts. The computer system includes a comparative program/software for tracking and comparing live and demo accounts, and for generating reports thereon, such as a printer, a computer screen, or other displaying device.

It is noted that FIG. 1a is a circumstance where the trade/bet is flat (i.e., "offset") at logout. Thus, it illustrates an example of a sequence that may occur, taking into account other changes that are outlined in this document and that could occur due to other unforeseen items such as that limited to company/system processes, etc. It is noted that FIG. 1b is a circumstance where the trade/bet is not flat (i.e., "offset") at logout. Thus, it takes into account any probability changes that may have occurred after logout.

It is specifically contemplated that the present inventive concepts can be used in a similar system set up to train/test a person in a gambling or betting situation, such as at a casino (or prior to going to the casino but with friends).

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A method of training to help control emotions from financial investment decisions, comprising steps of:
   setting up a user account on a computer system having a data base including a live account and a demo account, and including a single masked login;
   depositing real funds in the live account;

showing "fake" money in the demo account that is equal to the real funds;

providing a randomizer program on the computer system for randomly causing trading in the live and/or demo accounts according to a predetermined percentage;

allowing a user to log in;

running the randomizer program in the computer system to give the user access to one of the live or demo accounts;

allowing the user to place trades/bets without letting the user know if they are trading in the live or demo account;

determining if trades/bets on the live and demo accounts do not have similar results;

if the trade/bets do not have similar results, forcing the user to continue trading on the accessed account without the randomizer being re-engaged and without allowing the user to know which is the accessed account;

upon the user logging out, causing the live and demo accounts in the database of the computer system to sync again to the live account;

generating data concerning differences between live and demo accounts; and displaying data to at least one of the user and a system controller.

2. A method of training to help a user control emotions from financial investment decisions, comprising steps of:

setting up a live account and a demo account on a computer system having a data base;

depositing real value units in the live account;

showing an amount of "false" value units in the demo account that is equal to the real value units;

randomly causing trading in one or both of the live and demo accounts in the computer system according to a predetermined percentage;

giving the user access to one of the live or demo accounts without showing the user which one account is active;

allowing the user to place trades/bets without letting the user know if they are trading in the live or demo account; and generating comparison data from final data in the live and demo accounts in the data base in the computer system for evaluative purposes.

3. The method defined in claim 2, including providing feedback concerning difference in the final data from the live and demo accounts.

4. The method defined in claim 2, including providing a randomizer for randomly controlling which of the live and demo accounts are active, and if the trade/bets are not the same, forcing the user to continue trading on the accessed account without the randomizer being engaged and without allowing the user to know which is the accessed account.

5. The method defined in claim 2, including a step of causing the live and demo accounts to sync again to the live account upon the user logging out.

6. The method defined in claim 2, wherein the step of comparing includes generating data showing differences between live and demo accounts.

7. The method defined in claim 3, wherein the step of providing feedback includes displaying the final data to at least one of the user, a system coordinator, and/or an employer.

8. The method defined in claim 2, including utilizing a web application.

9. An apparatus for training to help a user control emotions from financial investment decisions comprising:

a computer system including at least one computer, a user input, a database, and at least one display;

the computer system having a computer programmed with a randomizer program and a data base having live and demo accounts, an operational program for affecting trades in the live and demo accounts in the data base based on predetermined percentages but randomized access, and a comparator program that compares information related to account activity and favorable/unfavorable results in the live and demo accounts, the computer system generating a comparative report displaying the activity and results; and a line connecting the computer system to a second system for implementing trades on the live account.

10. The apparatus defined in claim 9, wherein the computer system includes a web application.

11. An apparatus for training to help a user control emotions from financial investment decisions, comprising:

a computer system including at least one computer, a user input, a data base having at least a live account and a demo account, and at least one display;

the computer being programmed with a randomizer program for providing randomized access incorporating predetermined access percentages, an operational program for affecting trades in the live and demo accounts in the data base based on the predetermined access percentages of the randomized access, and a comparator program that prepares comparative information related to account activity in the live and demo accounts, the computer system further being programmed to, upon the user logging out, synchronize the live and demo accounts in the database of the computer system to the live account.

12. The apparatus defined in claim 11, wherein at least one of the operational program and the comparator program providing feedback comparing results in the live and demo accounts via the at least one display.

13. The apparatus defined in claim 8, wherein the comparator program is configured to provide the feedback and is connected to the at least one display to provide the feedback in the form of a summary report showing and comparing the activity and results.

14. The apparatus defined in claim 12, including a line connecting the computer system to a second system for implementing trades on the live account.

15. The apparatus defined in claim 14, wherein the line connects the computer system and/or web application to an internet connection.

16. The apparatus defined in claim 12, including a web application.

17. The apparatus defined in claim 11, wherein the computer system is programmed to, upon the user logging out, synchronize the live and demo accounts in the database of the computer system to the live account.

* * * * *